(12) United States Patent
Jiang et al.

(10) Patent No.: US 11,516,807 B2
(45) Date of Patent: Nov. 29, 2022

(54) METHOD AND DEVICE FOR CONFIGURING CONTROL CHANNEL, METHOD AND DEVICE FOR DETECTING CONTROL CHANNEL, PROGRAM AND MEDIUM

(71) Applicant: VIVO MOBILE COMMUNICATION CO., LTD., Chang'an Dongguan (CN)

(72) Inventors: Dajie Jiang, Chang'an Dongguan (CN); Xiaodong Shen, Chang'an Dongguan (CN); Xueming Pan, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 253 days.

(21) Appl. No.: 16/957,427

(22) PCT Filed: Nov. 23, 2018

(86) PCT No.: PCT/CN2018/117151
§ 371 (c)(1),
(2) Date: Jun. 24, 2020

(87) PCT Pub. No.: WO2019/128580
PCT Pub. Date: Jul. 4, 2019

(65) Prior Publication Data
US 2020/0322946 A1    Oct. 8, 2020

(30) Foreign Application Priority Data
Dec. 25, 2017   (CN) .......................... 201711421794.9

(51) Int. Cl.
*H04W 72/04* (2009.01)
*H04W 76/27* (2018.01)
(Continued)

(52) U.S. Cl.
CPC ......... *H04W 72/048* (2013.01); *H04L 5/0055* (2013.01); *H04W 68/005* (2013.01);
(Continued)

(58) Field of Classification Search
CPC ............. H04W 72/048; H04W 72/042; H04W 72/0446; H04W 72/0453; H04W 80/02;
(Continued)

(56) References Cited

U.S. PATENT DOCUMENTS

2017/0195888 A1    7/2017  Gou et al.
2018/0020441 A1*   1/2018  Lo ......................... H04W 76/14
(Continued)

FOREIGN PATENT DOCUMENTS

CN    105207754 A    12/2015
WO    2017026777 A1   2/2017

OTHER PUBLICATIONS

Chinese Office Action for related Chinese Application No. 201711421794.9; reported on Jun. 1, 2020.
(Continued)

*Primary Examiner* — Wei Zhao
(74) *Attorney, Agent, or Firm* — von Briesen & Roper, s.c.

(57) ABSTRACT

A method and a device for configuring a control channel, a method and a device for detecting a control channel, a program and a medium are provided. The method for configuring a control channel includes: transmitting, by a network-side device, downlink control information (DCI) to a terminal in a physical downlink control channel (PDCCH), where the DCI includes indication information for indicating not to monitor PDCCH; and transmitting the PDCCH to the terminal in a slot or a time-frequency resource where a
(Continued)

fallback PDCCH subsequent to the PDCCH is located, when determining that the terminal does not successfully receive the DCI in the PDCCH.

20 Claims, 5 Drawing Sheets

(51) Int. Cl.
*H04L 5/00* (2006.01)
*H04W 68/00* (2009.01)
*H04W 72/14* (2009.01)
*H04W 80/02* (2009.01)

(52) U.S. Cl.
CPC ..... *H04W 72/042* (2013.01); *H04W 72/0446* (2013.01); *H04W 72/0453* (2013.01); *H04W 72/14* (2013.01); *H04W 76/27* (2018.02); *H04W 80/02* (2013.01)

(58) Field of Classification Search
CPC .... H04W 76/27; H04W 68/005; H04L 5/0055
See application file for complete search history.

(56) References Cited

U.S. PATENT DOCUMENTS

| | | |
|---|---|---|
| 2018/0227885 A1 | 8/2018 | Lee et al. |
| 2019/0058629 A1* | 2/2019 | Akoum ................. H04L 5/0048 |
| 2019/0082448 A1* | 3/2019 | Nogami ............ H04W 72/1289 |

OTHER PUBLICATIONS

Hisilicon Huawei, "PDCCH reliability for URLLC", Nov. 27-Dec. 1, 2017, 3GPP TSG RAN WG1 Meeting #91, Reno, US.

Hisilicon Huawei, "Designs for UE power saving", Nov. 27-Dec. 1, 2017, 3GPP TSG RAN WG1 Meeting #91, Reno, US.

NTT Docomo, Inc., "Remaining DL/UL signaling design for CBG-based (re)transmission", Nov. 27-Dec. 1, 2017, 3GPP TSG RAN WG1 Meeting 91, Reno, US.

Extended European Search Report for related Application No. 18895510.8; reported on May 3, 2021.

NTT Docomo, Inc., "Remaining details on search space", Nov. 27-Dec. 1, 2017, 3GPP TSG RAN WG1 Meeting 91, Reno, USA, R1-1720812.

* cited by examiner

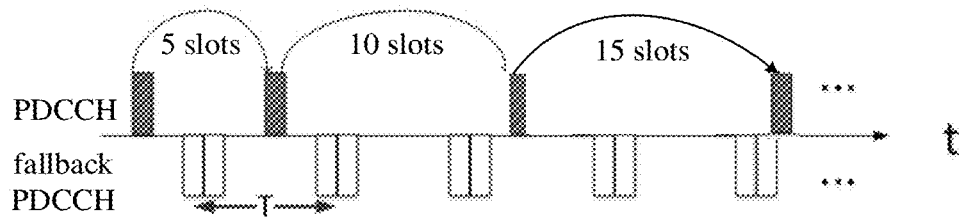

FIG. 4

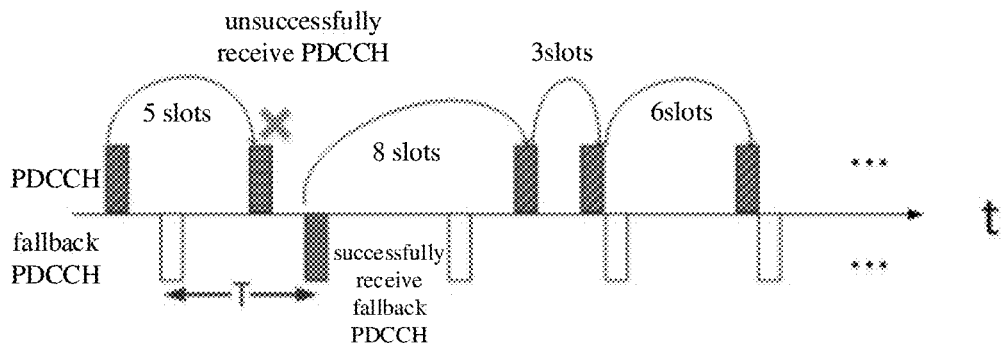

FIG. 5

| in a case that indication information for indicating not to monitor a PDCCH has been detected in DCI carried by the PDCCH, a terminal does not monitor the PDCCH in a slot indicated by the indication information | 202 |
|---|---|

| in a case that the DCI in the PDCCH is not successfully received, the terminal monitors the PDCCH in a slot resource where a fallback PDCCH is located, where the slot resource is configured or reconfigured by the network-side device | 204 |
|---|---|

FIG. 6

METHOD AND DEVICE FOR CONFIGURING CONTROL CHANNEL, METHOD AND DEVICE FOR DETECTING CONTROL CHANNEL, PROGRAM AND MEDIUM

CROSS-REFERENCE TO RELATED APPLICATION

This application is the U.S. national phase of PCT Application No. PCT/CN2018/117151 filed on Nov. 23, 2018, which claims a priority to Chinese Patent Application No. 201711421794.9 filed on Dec. 25, 2017, both disclosures of which are incorporated in their entireties by reference herein.

TECHNICAL FIELD

The present disclosure relates to communication technologies, and in particular to a method and a device for configuring a control channel, a method and a device for detecting a control channel, a program and a medium.

BACKGROUND

In related technologies, in Long Term Evolution (LTE) and 5th Generation (5G) mobile communication New Radio (NR) access technologies, a user equipment (UE) usually performs physical downlink control channel (PDCCH) blind detection in every subframe or every slot. If the UE receives a PDCCH belonging to itself, the UE receives downlink data or transmits uplink data on a time-frequency resource indicated by the PDCCH, or if the UE does not receive a PDCCH belonging to itself, the UE continues to perform PDCCH blind detection on the next subframe or the next slot.

In the process of implementing the present disclosure, inventors found that because of random or non-uniform arrival times of different service packets, when a UE is in an active state and persistently monitors a PDCCH in an actual network, the PDCCH belonging to the UE cannot be received in every subframe or every slot. For a PDCCH that does not belong to the UE, power of the UE is consumed by the behavior of blindly detecting the PDCCH in corresponding subframes or slots, but the required data information is not received.

SUMMARY

According to an aspect of embodiments of the present disclosure, a method for configuring a control channel is provided, which is applied to a network-side device and includes:
 transmitting downlink control information (DCI) to a terminal through a physical downlink control channel (PDCCH), where the DCI includes indication information for indicating not to monitor the PDCCH; and
 transmitting the PDCCH to the terminal in a slot or a time-frequency resource where a fallback PDCCH subsequent to the PDCCH is located, when determining that the terminal does not successfully receive the DCI in the PDCCH.

According to another aspect of the embodiments of the present disclosure, a method for detecting a control channel is provided, which is applied to a terminal, and includes:
 in a case that indication information for indicating not to monitor a physical downlink control channel (PDCCH) has been detected in downlink control information (DCI) carried by the PDCCH, not monitoring PDCCH in a slot indicated by the indication information; and
 in a case that the DCI in the PDCCH is not successfully received, monitoring the PDCCH in a slot or a time-frequency resource where a fallback PDCCH is located, wherein the slot or the time-frequency resource is configured by a network-side device.

According to yet another aspect of the embodiments of the present disclosure, a device for configuring a control channel is provided, which is applied in a network-side device, and includes:
 a first communication module, configured to transmit downlink control information (DCI) to a terminal through a physical downlink control channel (PDCCH), and transmit the PDCCH to the terminal in a slot where a fallback PDCCH subsequent to the PDCCH is located, when determining that the terminal does not successfully receive the DCI in the PDCCH.

According to still another aspect of the embodiments of the present disclosure, a device for detecting a control channel is provided, which is applied in a terminal, and includes:
 a second communication module, configured to: in a case that downlink control information (DCI) on a physical downlink control channel (PDCCH) is not successfully received, monitor the PDCCH in a slot or a time-frequency resource where a fallback PDCCH is located configured by a network-side device; and
 a detection module, configured to instruct the second communication module not to monitor the PDCCH in a slot indicated by the indication information, in a case that indication information for indicating not to monitor PDCCH has been detected in the DCI carried by the PDCCH.

According to still another aspect of the embodiments of the present disclosure, a computer program is provided, which includes a computer-readable code, and when the computer-readable code runs on a device, a processor in the device executes instructions for implementing various steps in the method according to any of the embodiments of the present disclosure.

According to still another aspect of the embodiments of the present disclosure, a computer-readable storage medium is provided, which is configured to store computer-readable instructions. The instructions are executed to implement operations of various steps in the method according to any of the embodiments of the present disclosure.

According to still another aspect of the embodiments of the present disclosure, a network-side device is provided, which includes a processor, a memory, and a program stored in the memory and executable on the processor. The processor is configured to execute the program to implement operations of various steps in the method for configuring a control channel according to any of the embodiments of the present disclosure.

According to still another aspect of the embodiments of the present disclosure, a terminal is provided, which includes a processor, a memory, and a program stored in the memory and executable on the processor. The processor is configured to execute the program to implement operations of various steps in the method for detecting a control channel according to any embodiment of the present disclosure.

BRIEF DESCRIPTION OF THE DRAWINGS

Drawings that form a part of the present specification are used to illustrate embodiments of the present disclosure, so as to explain principles of the present disclosure in conjunction with illustration.

Referring to the drawings, the present disclosure can be more clearly understood from the following detailed description, in which:

FIG. 4 is another exemplary schematic diagram of configured or reconfigured. PDCCH and fallback PDCCH according to an embodiment of the present disclosure;

FIG. 5 is an exemplary schematic diagram of a network-side device re-transmitting a PDCCH to a UE on CORESET of a fallback PDCCH when the UE fails to receive DCI on a current PDCCH according to an embodiment of the present disclosure;

FIG. 6 is a flowchart of a method for detecting a control channel according to an embodiment in the embodiments of the present disclosure;

DETAILED DESCRIPTION

Figure 1:
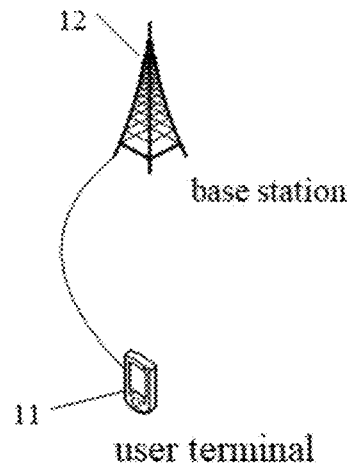
FIG. 1 is a schematic structural diagram of a network system accord info to an embodiment in the embodiments of the present disclosure.

Technical solutions according to embodiments of the present disclosure will be clearly and fully described below with reference to the accompanying drawings in the embodiments of the present disclosure. Apparently, the described embodiments are some rather than all of the embodiments of the present disclosure. Based on the embodiments of the present disclosure, all other embodiments obtained by a person of ordinary skill in the art without creative efforts shall fall within the protection scope of the present disclosure.

Such terms as "first" and "second" in the present specification and in claims of the present disclosure are used to distinguish similar objects without having to describe a particular sequence or order. It should be understood that data used in this manner may be interchangeable where appropriate so that the embodiments of the present disclosure described herein, for example, are implemented in an order other than orders illustrated or described herein. Furthermore, such terms as "include", "have" and any variant thereof are intended to cover non-exclusive inclusion, for example, a process, a method, a system, a product or a device that includes a series of steps or units are not necessarily limited to those steps or units that are clearly listed, but may include other steps or units that are not clearly listed or inherent to the process, the method, the product or the device. In addition, the term "and/or" in the present specification and claims represents at least one of objects linked by this term. For example, "A and/or B" represents the presence of three cases: A alone, B alone, and both A and B.

In the embodiments of the present disclosure, words such as "exemplary" or "for example" are used to represent examples, illustrations, or explanations. Any embodiment or design described as "exemplary" or "or example" in the embodiments of the present disclosure should not be interpreted as being more preferred or advantageous than other embodiments or designs. Precisely speaking, words such as "exemplary" or "for example" are intended to present relevant concepts in a specific way.

Embodiments of the present disclosure will be described hereinafter in conjunction with the accompanying drawings. A method for monitoring a control channel, a method for indicating the monitoring, a terminal, and a network-side device provided in the embodiments of the present disclosure may be applied to a wireless communication system. The wireless communication system may be a system using the $5^{th}$ Generation (5G) mobile communication technolony (hereinafter referred to as a 5G system for short). A person skilled in the art may understand that the 5G new radio (NR) system is only as an example, which is not limited herein.

Techniques, methods and devices known to those of ordinary skill in the relevant field may not be discussed in detail, but where appropriate, such techniques, methods and devices should be considered as part of the present specification.

It should be noted that similar numerals and letters represent similar terms in the following drawings. Therefore, once an item is defined in one of the drawings, the item is not required to be further discussed in the subsequent drawings.

In view of power consumption caused by PDCCH monitoring and a PDCCH monitoring delay, a method and a device for configuring a control channel, a method and a device for detecting a control channel, a program and a medium are provided according to embodiments of the present disclosure.

The embodiments of the present disclosure may be applied to a network system, including a user terminal 11 (terminal for short) and a network-side device 12. The terminal 11 may be a user equipment (UE), which may be, for example, a terminal-side device such as a mobile phone, a tablet personal computer, a laptop computer, a personal digital assistant (PDA), a mobile Internet device (MID), or a wearable device, It should be noted that a specific type of the terminal 11 is not limited in the embodiments of the present disclosure. The network-side device may be a 5G base station or a base station in a later generation (for example, gNB or 5G NR NB), or a base station in communication systems, or may be referred to as Node B. It should be noted that in the embodiments of the present disclosure, a 5G base station is only used as an example, but the specific type of the network-side device 12 is not limited thereto.

To describe the embodiments of the present disclosure, some concepts used in the following descriptions are first explained.

In a Long Term Evolution (LTE) system, since a terminal does not know some information about a physical downlink control channel (PDCCH) (for example, a transmission resource), the terminal detects the PDCCH transmitted by a base station in a blind decoding manner to obtain downlink control information (DCI). The terminal needs to perform control channel blind detection in each non-Discontinuous Reception (non-DRX) downlink subframe. The number of blind PDCCH detections performed by a terminal is related to the following parameters:

- types of DCI formats supported by the terminal at the same time: each type of DCI format has a different DCI size from each other type of DCI format, where taking LTE as an example, the terminal needs to blindly detect two types of DCI formats, such as DCI format 1A and DCI format 2;
- a aggregation level (AL) at which a PDCCH needs to be blindly detected by the terminal: in LTE systems, possible PDCCH ALs include {1, 2, 4, 8} control channel elements (CCEs), and the terminal selects all or part of the ALs in the set based on a protocol or a network configuration; and
- a PDCCH search space for terminal blind detection: the search space in LTE systems is defined as a set of control channel particle resources that need blind detection at each AL, including a CCE starting location and the number of candidate resources.

The PDCCH blind detection in LIE systems will be described in detail below.

For example, in LIE, since the PDCCH is an instruction transmitted by a base station, before receiving the PDCCH, a UE has received no other information than some system information, the terminal does not know the size and location of CCEs occupied by the PDCCH and a format of transmitted. DCI. Therefore, the PDCCH detection belongs to blind detection.

First, the UE needs to determine a format of DCI carried by the PDCCH. For the format of the DCI, the UE may obtain a certain type of DCI according to its current expected state. For example, when a UE is in idle state, the expected information is system information (SI); when the UE is to transmit uplink data, a UE grant is expected; and when a random access is initiated, a Random Access Channel (RACH) response is expected. For different pieces of information, a UE uses corresponding Radio Network Temporary Identity (RNTI) to perform Cyclic Redundancy Check (CRC) on CCE information, and if the CRC succeeds, the UE knows that the information is needed by itself, and further decodes the content of the DCI in accordance with a modulation and encoding manner.

Second, if a UE traverses all the CCEs, the calculation may be large for the UE. Therefore, in the LIE systems, available CCEs are divided into two search spaces, which are common search space and UE-specific search space. Data transmitted in the common search space mainly includes system information, random access response (RAR), paging information and other messages, which should be searched by each user. A location of the common search space is fixed, always in CCE0 to CCE16, and there are only two types of ALs in the common search space, which are 4 and 8. Thus, when a user searches the common search space, the user searches for four times starting from CCE 0 according to an AL being 4, and then searches twice at an AL of 8. Starting points for search are different for various UEs, and the search space have four types of ALs, which are 1, 2, 4 and 8, where search is performed for six times at the AL of 1, search is performed six times at the AL of 2, search is performed twice at the AL of 4, and search is performed twice at the AL of 8. The number of blind detections performed by the UE can be calculated as follows: the common search space is searched for 6 times, and the UE-specific search space is searched for 16 times. In the UE-specific search space, the DCI formats for a UE at the same time have only two sizes of payloads, so the UE needs to search twice, that is, the UE-specific search space being searched for 32 times. When performing blind detection in the PDCCH search space, the UE only needs to attempt to decode possible DCIs, and does not need to match all the DCI formats.

The blind detection of a UE refers to that the UE finds a starting position of a CCE, intercepts DCI with a guessed length at the starting position of the CCE, decodes the DCI, and if a CRC of the decoded information bits is the same as a CRC carried by the PDCCH, considers that the information bits carned by the current PDCCH are the currently transmitted DCI. Various RNTIs are hidden in the CRC.

In the related technology, periodic PDCCH monitoring is supported by NR, that is, PDCCH is monitored in every several slots or every several OFDM symbols, so that the power consumption of PDCCH monitoring can be reduced, as compared with frequently PDCCH monitoring by the UE. However, due to the randomness of arrival times of service packets and the randomness of faults occurring to service packets, it is difficult for a base station to select an appropriate PDCCH monitoring periodicity for each type of service and each UE. Actually, in addition to the periodic PDCCH monitoring, the UE needs some additional PDCCH monitoring.

In the embodiments of the present disclosure, an additional PDCCH is introduced on the basis of periodic PDCCH monitoring to solve problems that the arrival time of a service packet and an error occurring to the service packet are random.

Figure 2:
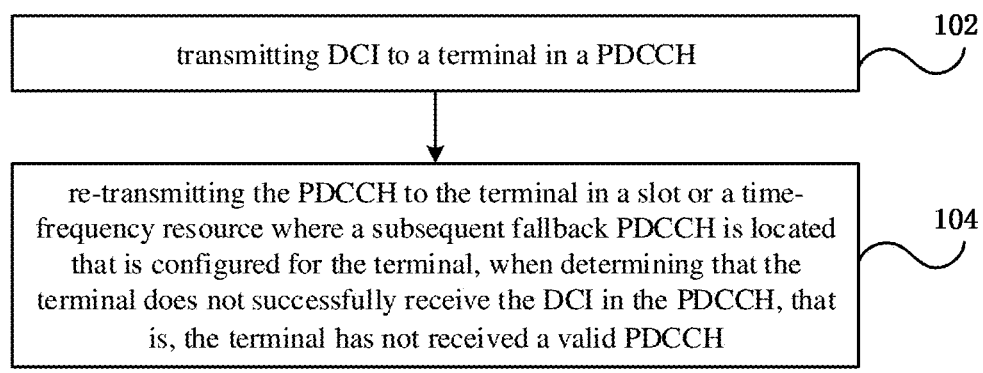
FIG. 2 is a flowchart of a method for configuring a control channel according to an embodiment in the embodiments of the present disclosure.

FIG. 2 is a flowchart of a method for configuring a control channel according to an embodiment in the embodiments of the present disclosure. As shown in FIG. 2, the method for configuring a control channel according to the embodiment is applied to a network-side device and includes step 102 and step 104.

Step 102 includes: transmitting DCI to a terminal in a PDCCH.

The DCI includes indication information for indicating not to monitor PDCCH, so that the terminal does not monitor the PDCCH in a subsequent slot indicated by the indication information.

The indication information is used to indicate a slot in which the PDCCH does not need to be monitored subsequently. In embodiments of the present disclosure, DCI carried by a PDCCH may include group-common DCI or UE-specific DCI. Group-common DCI and UE-specific DCI belong to different search spaces. A starting position and a channel search manner of PDCCH blind detection are defined by the search space. Based on the definition of the search space, the terminal can determine control channel element (CCE) resources that need to be blindly detected, which includes a starting position of a CCE and the number of candidate resources.

Step 104 includes: re-transmitting the PDCCH to the terminal in a slot or a time-frequency resource where a fallback PDCCH subsequent to PDCCH is located configured for the terminal, when determining that the terminal does not successfully receive the DCI in the PDCCH, that is, the terminal has not received a valid PDCCH.

That the terminal does not successfully receive the DCI in the PDCCH means that a cyclic redundancy check (CRC) information of information bits obtained by the terminal decoding a CCE in a search space does not match a CRC dedicated for the terminal.

Based on the method for configuring a control channel provided in the foregoing embodiments of the present disclosure, a network-side device may transmit DCI to a terminal in a PDCCH, so as to configure, for the terminal, a slot or a time-frequency resource where a fallback PDCCH is located. The DCI includes indication information for indicating not to monitor PDCCH, so that the terminal does not monitor the PDCCH in the slot indicated by the indication information. In a case that the terminal does not successfully receive the DCI in the PDCCH, the network-side device transmits the PDCCH again to the terminal in a slot where a subsequent fallback PDCCH is located configured for the terminal, so that the terminal can monitor the PDCCH again. In the embodiments of the present disclosure, unnecessary blind detections of the terminal are reduced without affecting communication services, and the battery power of the terminal is saved.

In an implementation according to various e embodiments of the present disclosure, slots indicated by the indication information may be consecutive slots or non-consecutive slots, which, for example, may include but not limited to: N subframes, N slots, N mini-slots, N milliseconds, or an unknown slot after a slot in which the PDCCH is located, where N is an integer greater than 0. Each of the mini-slots may include M orthogonal frequency division multiplexing (OFDM) symbols, where M is an integer greater than 0 and less than 14, for example, M may be 2, 4, 7, or the like.

In another implementation according to various embodiments of the present disclosure, the network-side device may configure or reconfigure a time granularity of slots indicated by the indication information to the terminal by means of a Radio Resource Control (RRC) signaling or a Media Access Control Control Element (MAC CE). In addition, the network-side device may configure or reconfigure the time granularity of the slots indicated by the indication information based on a predefined protocol between the network-side device and the terminal. In this way, based on the time granularity in accordance with the configuration or the predefined protocol, the terminal may determine a corresponding slot just from the indication information carried in the DC without directly transmitting the slot by the DCI, which is convenient for implementation. In embodiments of the present disclosure, different time granularities may be separately configured for different terminals or different services. In yet another implementation according to various embodiments of the present disclosure, the indication information may be carried in L bits extended in DCI, or may be carried in L bits in original information bits of the DCI after redefining the original information bits of the DCI, where L is an integer greater than 0. For example, when L is equal to 2, the indication information is carried by two information bits.

For example, in an application example, it is assumed that slots where PDCCH is not monitored are 0 slot, 10 slots, 20 slots, or 40 slots after the slot in which the PDCCH is located, and a time granularity is 5 slots, indication information carried in L bits may be used to indicate 2 types of slot resources. As an example, 00, 01, 10 and 11 of 2 bits are respectively used to indicate [0, 10, 20, 40] slots after the slot in which the PDCCH is located, that is, 00, 01, 10 and 11 of the 2 bits are respectively used to indicate time granularities of 0, 2, 4, and 8. As another example, 00, 01, 10 and 11 of 2 bits are respectively used to indicate [0, 10, 20, unknown] slots after the slot in which the PDCCH is located, that is, time granularities of 0, 2, 4, and unknown time granularity are indicated by 00, 01, 10, and 11 of 2 bits, respectively.

In the embodiments of the present disclosure, the method for configuring a control channel according to another embodiment may further include: configuring or reconfiguring, by the network-side device for the terminal, a slot set or the time-frequency resource where the fallback PDCCH is located by DCI, or RRC signaling, or MAC CE.

The slot set of the fallback PDCCH, that is, a set of slots of the fallback PDCCH, may include multiple slots. The network-side device may configure the slots of the fallback PDCCH for the terminal, or may further configure time-frequency resources in the slots, or may separately configure a time-frequency resource of the fallback PDCCH for the terminal.

In embodiments of the present disclosure, a slot set or a time-frequency resource of a fallback PDCCH is configured for a terminal, so that when the terminal does not successfully receive the PDCCH, a PDCCH (that is, the fallback PDCCH) may be transmitted to the terminal again in a slot or a time-frequency resource where a certain fallback PDCCH subsequent to the PDCCH is located, thereby solving a problem of how to receive a PDCCH again after the terminal does not successfully receive the PDCCH.

In an optional example, slots where a fallback PDCCH is located that are configured by a network-side device for a terminal may include, for example, a periodicity T of the fallback PDCCH and slots of the fallback PDCCH (that is, slots belonging to the fallback PDCCH within each periodicity T), and slots within each periodicity T may include, for example, R subframes, R slots, R mini-slots, or R milliseconds, where R is an integer greater than 0.

The periodicity T may be represented in unit of a frame length, for example, each periodicity T may be expressed as one-half frame or N frames. The slots belonging to the fallback PDCCH in each periodicity T may be expressed by the subframe number, the slot number, the OFDM number, or the millisecond number in the periodicity T. One frame has 10 subframes and corresponds to 10 milliseconds, each subframe includes two slots, and each slot includes seven OFDM symbols. For example, the length of each periodicity T is one frame, including 10 subframes with serial numbers 0 to 9, and the slots belonging to the fallback PDCCH in each periodicity T may be represented, for example, as subframe 2 and subframe 5. In the foregoing embodiments, the smaller T and the larger R means that the terminal has more occasions to monitor the PDCCH; and the larger T and the smaller R means that the terminal has less occasions to monitor the PDCCH, and more power consumption is saved.

In an optional example, the network-side device may configure the above T and R differently depending on a type of a terminal and/or a type of a service. For example, an Internet terminal with a low requirement on latency is configured with the larger T and smaller R, so that the power consumption of terminal can be reduced without affecting the service experience. A voice terminal with a high requirement on latency is configured with the smaller T and larger R, which can guarantee service experiences of users. The smaller T and larger R are configured for services that are more sensitive to latency, such as Internet Protocol Telephone (VoIP). The larger T and smaller R may be configured for services that are less sensitive to latency, such as File Transfer Protocol (ftp) download services. The unit of T may be a millisecond or a slot, and a starting point of periodicity T may be, for example, subframe 0, where 0 is a system frame number (SFN).

Figure 3:
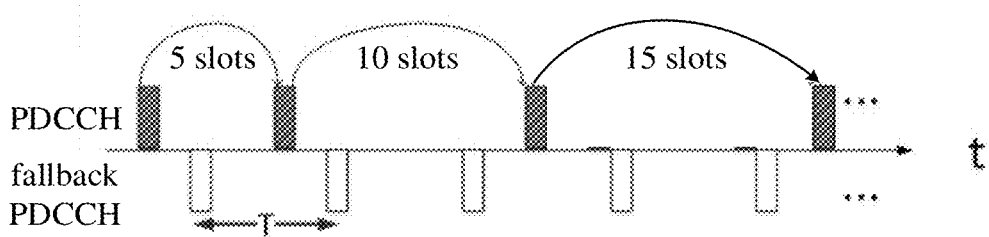
FIG. 3 is an exemplary schematic diagram of configured or reconfigured PDCCH and fallback PDCCH according to an embodiment of the present disclosure.

As shown in FIG. 3, FIG. 3 is an exemplary schematic diagram of PDCCH and fallback PDCCH configured or reconfigured by a network-side device according to an embodiment of the present disclosure. FIG. 4 is another exemplary schematic diagram of PDCCH and fallback PDCCH configured or reconfigured by a network-side device according to an embodiment of the present disclosure.

As shown in FIG. 3, DCI of a PDCCH of a terminal scheduled by the network-side device includes indication information of 2 bits, which is used to indicate that the terminal does not need to monitor the PDCCH in subsequent X slots. A time granularity configured by the network-side device for the terminal is 5 slots. 00, 01, 10, and 11 of 2 bits respectively indicate time granularities of 1, 2, 3, and 4, that is, [0, 10, 15, 20] slots. PDCCH DCI indicates that the terminal does not need to monitor the PDCCH in 0 slot, 10 slots, 15 slots, and 20 slots subsequent to the PDCCH, respectively, which results in energy conservation, as compared with monitoring PDCCH in every slot. As shown in FIG. 3 and FIG. 4, the fallback PDCCH is periodic and has a periodicity of T, and each periodicity T includes R (R=1 or R>1) fallback PDCCHs. In the embodiment shown in FIG. 3, T=5 slots and R=1, that is, each periodicity T includes one fallback PDCCH. In the embodiment shown in FIG. 4, T=5 slots and R=2, that is, each periodicity T includes two fallback PDCCHs.

FIG. 5 is an exemplary schematic diagram of a network-side device re-transmitting a PDCCH to a terminal in a slot where a subsequent fallback PDCCH is located configured for the terminal when the terminal does not successfully receive DCI in the PDCCH, according to an embodiment of the present disclosure.

In an implementation according to various embodiments of the present disclosure, it may be determined that the terminal does not successfully receive information in the PDCCH in the following cases:
  a case that on an acknowledgement or negative acknowledgement (ACK/NACK) resource corresponding to a downlink (DL) grant in the PDCCH, an ACK/NACK signal transmitted by the terminal has not been received; or
  a case that uplink (UL) data transmitted by the terminal has not been received on a physical uplink shared channel (PUSCH) resource corresponding to a UL grant in the PDCCH.

In an implementation according to various embodiments of the present disclosure about the method for configuring a control channel, in operation 106, the network-side device re-transmitting the PDCCH to the terminal in the slot or the time-frequency resource where a subsequent fallback PDCCH is located configured for the terminal may include: re-transmitting, by the network-side device, the PDCCH to the terminal in a slot or a time-frequency resource configured for the terminal where a first fallback PDCCH subsequent to the PDCCH is located after determining that the terminal has not successfully received DCI in the PDCCH.

In an example according to various embodiments of the present disclosure about the method for configuring a control channel, in a case that the terminal has no data scheduling subsequently, the network-side device may transmit DCI to the terminal on a previous PDCCH (that is, the above PDCCH) with data scheduling, and the DCI includes indication information for indicating not to monitor the PDCCH, that is, start to perform operation 102 in the foregoing embodiments, so as to indicate the terminal that PDCCH monitoring does not need to be performed in the slot indicated by the indication information. When the terminal has new data scheduling, the network-side device normally transmits the PDCCH to the terminal.

In another example according to various embodiments of the present disclosure about the method for configuring a control channel, in a case that no system information (SI) update indication or no paging is to be transmitted to the terminal currently, the network-side device transmits DCI including indication information for indicating not to monitor the PDCCH to the terminal in the PDCCH, that is, start to perform operation 102 in the forgoing embodiments, so as to indicate the terminal that PDCCH monitoring does not need to be performed in the slot indicated by the indication information. In a case that there is SI update indication or paging to be transmitted to the terminal, the network-side device normally transmits a PDCCH to the terminal, so that the terminal detects a PDCCH without data scheduling only in part of slots, and does not detect the PDCCH without data scheduling in each slot, which saves power of the terminal and reduces power consumption of the terminal.

Optionally, according to another embodiment in various embodiments of the present disclosure, the method for configuring a control channel may further include: in a case that there is no data to be scheduled for the terminal subsequently, not transmitting the PDCCH by the network-side device to the terminal; and in a case that there is new data to be scheduled for the terminal, the network-side device normally transmitting DCI to the terminal via the PDCCH.

Optionally, according to another embodiment in various of the present disclosure, the method for configuring a control channel may further include: in a case that there is no system information (SI) update indication or no paging to be transmitted to the terminal currently, not transmitting the PDCCH by the network-side device to the terminal; and in a case that there is an SI update indication or paging to be transmitted to the terminal, the network-side device normally transmitting DCI to the terminal via the PDCCH.

FIG. 6 is a flowchart of an embodiment of a method for detecting a control channel according to an embodiment in the embodiments of the present disclosure. The method for detecting a control channel shown in FIG. 6 includes step 202 and step 204.

In step 202, in a case that indication information for indicating not to monitor a PDCCH has been detected in DCI carried by the PDCCH, a terminal does not monitor the PDCCH in a slot indicated by the indication information.

The indication information is used to indicate a slot in which a PDCCH does not need to be monitored. In an implementation according to various embodiments of the present disclosure, the slot indicated by the indication information may be consecutive slots or non-consecutive slots, which, for example, may include but not limited to: N subframes, N slots, N sub-slots, N milliseconds, or an unknown slot after the slot in which the PDCCH is located, where N is an integer greater than 0. The mini-slots may include M OFDM symbols, and M is an integer greater than 0 and less than 14, for example, M may be 2, 4, or 7.

In various embodiments of the present disclosure, DCI carried by a PDCCH may include group-common DCI or UE-specific DCI.

In an implementation according to various embodiments of the present disclosure, PDCCH monitoring of a terminal is blind detection. When blindly detecting a PDCCH, the terminal may first determine which format of DCI carried by the PDCCH, find a starting position of a CCE and the number of candidate resources according to the format of DCI and an aggregation level and as defined by a search space, and intercept CCE with a corresponding length of the DCI format at the starting position of the CCE for demodulation and decoding. If CRC information of the decoded information bits is the same as a CRC specific by the terminal, the information bits carried by the PDCCH are taken as DCI of this terminal, and the terminal can read the content in the DCI.

Various embodiments of the present disclosure may be applied to LTE systems or NR systems. The terminal may determine which type of DCI format carried by the PDCCH. For example, in an LTE system, for a DCI format, the terminal may expect to obtain a certain DCI format according to its own state. For example, when the terminal is in idle state, system information (SI) is expected; when the terminal is to transmit uplink data, a terminal grant is expected; and when initiating a random access, the terminal expects a Random Access Channel (RACH) response.

In step 204, in a case that the DCI in the PDCCH is not successfully received, the terminal monitors the PDCCH in a slot resource where a fallback PDCCH is located, where the slot resource is configured or reconfigured by the network-side device.

Based on the method for detecting a control channel provided in the foregoing embodiments of the present disclosure, the terminal may monitor the PDCCH in the slot or the time-frequency resource in which the fallback PDCCH is located configured by the network-side device, when detecting that the DCI carried by the PDCCH includes indication information indicating not to monitor the PDCCH, the terminal does not monitor the PDCCH in the slot indicated by the indication information, and when the terminal does not successfully receive the DCI in the PDCCH, the terminal may monitor the PDCCH again in the slot or the time-frequency resource in which a subsequent fallback PDCCH is located. In the embodiments of the present disclosure, unnecessary blind detections of the terminal are reduced without affecting communication services, and the battery power of the terminal is saved, thereby reducing the power consumption of the terminal.

In addition, according to another embodiment of the embodiments of the present disclosure, the method for detecting a control channel may further include: receiving, by the terminal, a slot set or the time-frequency resource where the fallback PDCCH is located, where the slot set or the time-frequency resource is configured by the network-side device.

In an implementation according to various embodiments of the present disclosure, the receiving, by the terminal, the slot set or the time-frequency resource where the fallback PDCCH is located configured by the network-side device may be implemented in the following manner. For example, the terminal receives the slot set or the time-frequency resource where the fallback PDCCH is located, which is configured by the network-side device by RRC signaling or MAC CE. The slot set in which the fallback PDCCH is located may include a periodicity T of the fallback PDCCH and slots of the fallback PDCCH (that is, slots belonging to the fallback PDCCH within the periodicity T), and slots within each periodicity T include R subframes, R slots, R mini-slots, or R milliseconds, where R is an integer greater than 0.

The periodicity T may be represented in unit of a frame length, for example, each periodicity T may be expressed as one-half frame or N frames. The slots belonging to the fallback PDCCH in each periodicity T may be expressed by the subframe number, the slot number, the OFDM number, or the millisecond number in the periodicity T. One frame has 10 subframes and corresponds to 10 milliseconds, each subframe includes two slots, and each slot includes seven OFDM symbols. For example, the length of each periodicity T is one frame, including 10 subframes with serial numbers 0 to 9, and the slots belonging to the fallback PDCCH in each periodicity T may be represented as subframe 2 and subframe 5, for example.

In yet another implementation of various embodiments of the present disclosure, the indication information may be carried in L bits extended in DCI, or may be carried in L bits in original information bits of the DCI after re-dividing the original information bits of the DCI, where L is an integer greater than 0. For example, when L is equal to 2, the indication information is carried by two information bits.

Figure 7:
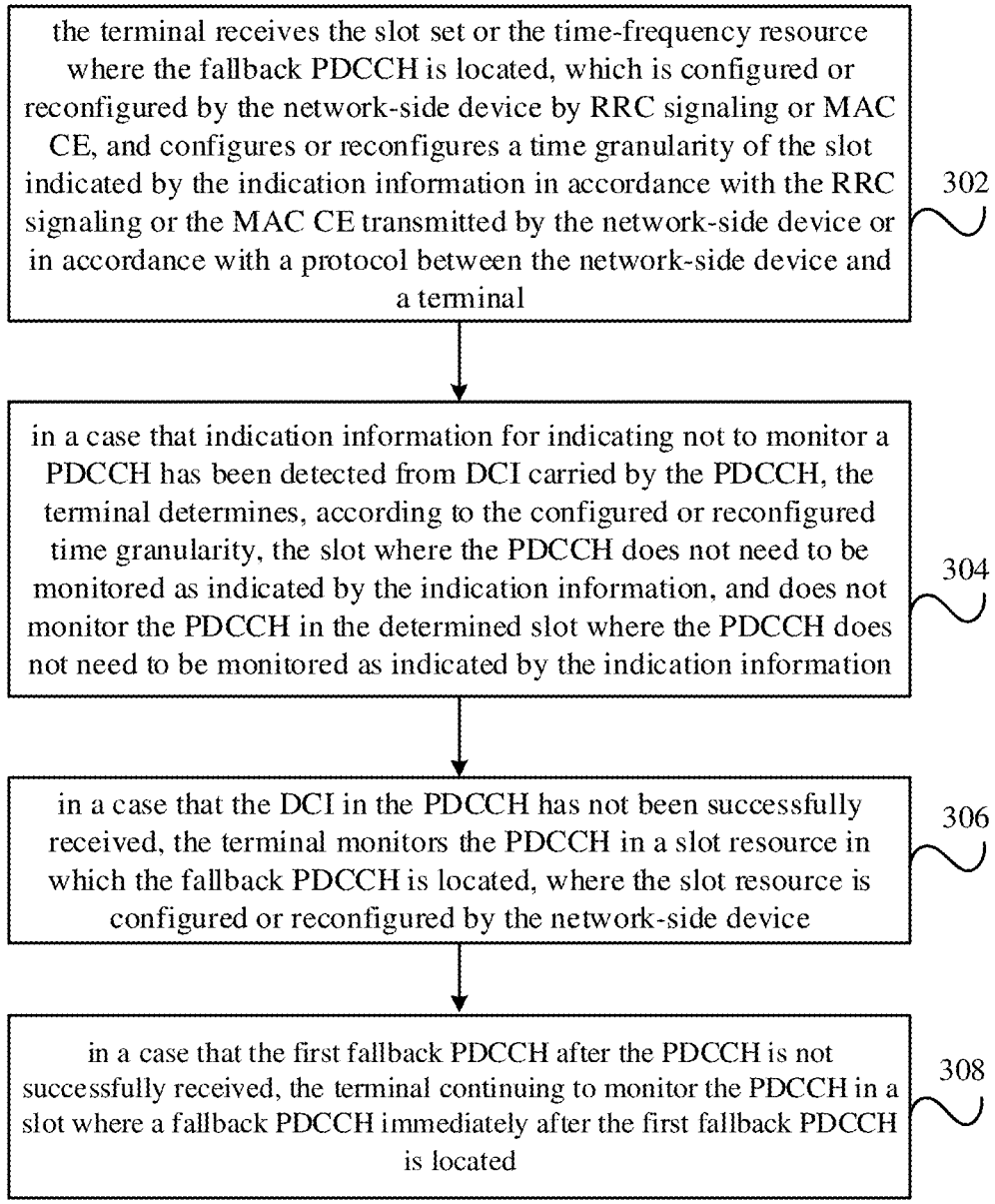
FIG. 7 is a flowchart of a method for detecting a control channel according to another embodiment in the embodiments of the present disclosure.

FIG. 7 is a flowchart of a method for detecting a control channel according to another embodiment in the embodiments of the present disclosure. As shown in FIG. 7, the method for detecting a control channel in this embodiment includes steps 302 to 308.

In step 302, the terminal receives the slot set or the time-frequency resource where the fallback PDCCH is located, which is configured or reconfigured by the network-side device by RRC signaling or MAC CE, and configures or reconfigures a time granularity of the slot indicated by the indication information in accordance with the RRC signaling or the MAC CE transmitted by the network-side device or in accordance with a protocol between the network-side device and a terminal.

In step 304, in a case that indication information for indicating not to monitor a PDCCH has been detected from DCI carried by the PDCCH, the terminal determines, according to the configured or reconfigured time granularity, the slot where the PDCCH does not need to be monitored as indicated by the indication information, and does not monitor the PDCCH in the determined slot where the PDCCH does not need to be monitored as indicated by the indication information.

The indication information is used to indicate a slot in which a PDCCH is not monitored.

In step 306, in a case that the DCI in the PDCCH has not been successfully received, the terminal monitors the PDCCH in a slot resource in which the fallback PDCCH is located, where the slot resource is configured or reconfigured by the network-side device.

In yet another embodiment of the method for detecting a control channel in the present disclosure, the slot indicated by the indication information may include consecutive slots or non-consecutive slots. For example, the slot may include known slot resources, such as N subframes, N slots, N mini-slots, or N milliseconds after the slot in which the PDCCH is located. The method may further include: continuing to monitor, by the terminal, the PDCCH in a first slot in a control resource set (CORESET) of the PDCCH after the slot indicated by the indication information. For example, when the slot indicated by the indication information includes N subframes, the terminal continues to monitor the PDCCH in the first subframe in the PDCCH control resource set after the N subframes indicated by the indication information.

In an implementation of various embodiments about the method for detecting a control channel in the present disclosure, when the slot indicated by the indication information is an unknown slot, the determining the slot where the PDCCH does not need to be monitored indicated by the indication information may include: determining preset slot resources starting from a slot of the PDCCH as time-frequency resources where the PDCCH does not need to be monitored. The preset slot resources starting from the slot of the PDCCH may include consecutive or non-consecutive slots resources, which may include, for example: S subframes, S slots, S mini-slots, or S milliseconds. Each of the mini-slots includes Q OFDM symbols, S is an integer not less than 0, and Q is an integer greater than 0 and less than 14.

In another implementation of various embodiments about the method for detecting a control channel in the present disclosure, the method further includes: the terminal continuing to monitor the PDCCH in a first slot in a PDCCH control resource set and after the preset slot resources starting from the slot of the PDCCH.

In an implementation, in step 306, in a case that the DCI in the PDCCH has not been successfully received, that the terminal monitors the PDCCH in the slot resource in which the fallback PDCCH is located that is configured or reconfigured by the network-side device may include: when a DL grant in the PDCCH is not successfully received, the terminal determining the first slot where a fallback PDCCH after a first duration is located as a slot for subsequent fallback PDCCH monitoring, and monitoring the PDCCH in the slot where the first fallback PDCCH after the first duration is located. The first duration lasts from a time when the network-side device transmits the PDCCH to a time when the network-side device transmits the fallback PDCCH in a slot where a fallback PDCCH immediately after the PDCCH is located, and within the first duration, the terminal feeds back an ACK/NACK signal and the ntwork-side device fails to receive the ACK/NACK signal transmitted by the terminal.

In another implementation, in step 306, in a case that the DCI in the PDCCH has not been successfully received, that the terminal monitors the PDCCH on a slot resource in which the fallback PDCCH is located that is configured or reconfigured by the network-side device may include: when an UL grant in the PDCCH is not successfully received, the terminal determining the first slot where a fallback PDCCH after a second duration is located as a slot for subsequent fallback PDCCH monitoring, and monitoring the PDCCH in the first slot where the fallback PDCCH after the second duration is located. The second duration lasts from a time when the network-side device transmits the PDCCH to a time when the network-side device transmits the fallback PDCCH in a slot where a nearest fallback PDCCH is located, and within the second duration, UL data is transmitted on the PUSCH from the terminal to the network-side device, and is not received by the network-side device.

In the foregoing implementations, there is a certain delay between a time when the network-side device detects the terminal having not received the PDCCH and a time when the network-side device retransmits the PDCCH. The terminal takes this delay into account. Therefore, it is more power-saving than the behavior of monitoring a PDCCH by a terminal in real time in the foregoing other implementations.

In another embodiment, in step 306, the terminal monitoring the PDCCH in the slot where the fallback PDCCH is located that is configured or reconfigured by the network-side device may include: determining, by the terminal, a slot where a first fallback PDCCH after the PDCCH is located as a slot for subsequent fallback PDCCH monitoring, and monitoring the PDCCH in the slot where the first fallback PDCCH after the PDCCH is located.

Further, referring to FIG. 7, in another embodiment of the present disclosure, the method for detecting a control channel may further include: step 308, in a case that the first fallback PDCCH after the PDCCH is not successfully received, the terminal continuing to monitor the PDCCH in a slot where a fallback PDCCH immediately after the first fallback PDCCH is located.

A person of ordinary skill in the art may understand that some or all of the steps for implementing the foregoing method embodiments may be performed by hardware under instruction of a related program, the foregoing program may be stored in a computer-readable storage medium, and the program is executed to perform steps in the foregoing method embodiments. The storage medium includes a variety of media that can store a program code, such as an ROM, an RAM, a magnetic disk, or an optical disc.

Figure 8:
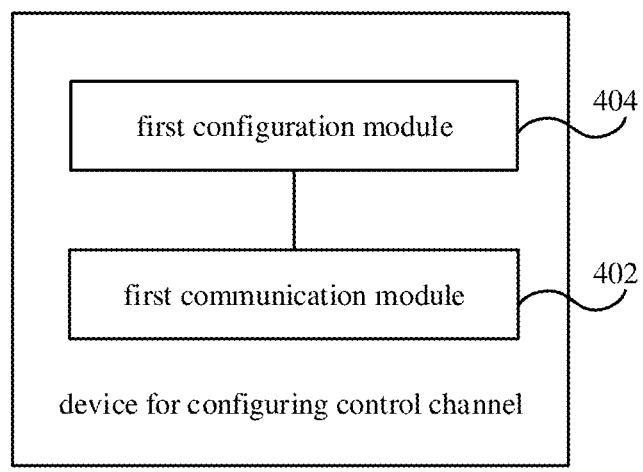
FIG. 8 is a schematic structural diagram of a device for configuring a control channel according to an embodiment in the embodiments of the present disclosure.

FIG. 8 is a schematic structural diagram of a device for configuring a control channel according to an embodiment in the embodiments of the present disclosure. The device for configuring a control channel according to the embodiment may be applied in a network-side device, such as a base station, to implement various embodiments of the present disclosure about the above method for configuring a control channel. As shown in FIG. 8, the device for configuring a control channel according to an embodiment includes a first communication module 402 configured to: transmit DCI to a terminal through a PDCCH, to configure the terminal with a slot set or a time-frequency resource where a fallback PDCCH is located, where the DCI includes indication information for indicating not to monitor a PDCCH, so that the terminal does not monitor the PDCCH in a slot indicated by the indication information, and the indication information is used to indicate a slot where a PDCCH is not monitored; re-transmit the PDCCH to the terminal in a slot where a fallback PDCCH subsequent to the PDCCH is located configured for the terminal, when determining that the terminal does not successfully receive the DCI in the PDCCH.

In an implementation, the slots indicated by the indication information may be consecutive slots or non-consecutive slots, which, for example, may include but not limited to: N subframes, N slots, N mini-slots, N milliseconds, or an unknown slot after a slot in which the PDCCH is located, where N is an integer greater than 0. Each of the mini-slots may include M orthogonal frequency division multiplexing (OFDM) symbols, where M is an integer greater than 0 and less than 14, for example, M may be 2, 4, 7, or the like.

Based on the foregoing embodiments of the present disclosure, the device for configuring a control channel transmits DCI to a terminal via a PDCCH, so as to configure, for the terminal, a slot or a time-frequency resource where a fallback PDCCH is located, and transmits the PDCCH again to the terminal in a slot where a subsequent fallback PDCCH is located configured for the terminal, in a case that the terminal does not successfully receive the DCI in the PDCCH, so that the terminal can monitor the PDCCH again. In the embodiments of the present disclosure, unnecessary blind detections of the terminal are reduced without affecting communication services, and the battery power of the terminal is saved, thereby reducing the power consumption of the terminal.

Optionally, referring to FIG. 8, in the embodiments of the present disclosure, the device for configuring a control channel according to another embodiment may further include: a first configuration module 404 configured to configure, for a terminal, a slot set or the time-frequency resource where the fallback PDCCH is located.

In addition, in another embodiment, the first communication module 402 may be further configured to configure or reconfigure a time granularity of the slot indicated by the indication information for a terminal by RRC signaling, or configure or reconfigure a time granularity of the slot indicated by the indication information in accordance with a protocol between the network-side device and a terminal.

In an implementation of various embodiments of the present disclosure about the device for configuring a control channel, when configuring the slot set where the fallback PDCCH is located for the terminal, the first configuration module 404 is specifically configured to configure a periodicity of the fallback PDCCH and slots of the fallback PDCCH for the terminal, where each periodicity includes R subframes, R slots, R mini-slots, or R milliseconds, R being an integer greater than 0.

In an implementation, when determining that the terminal does not successfully receive the DCI in the PDCCH, the first communication module 402 is specifically configured to:
determine that an ACK/NACK signal transmitted by the terminal is not received on an ACK/NACK resource corresponding to a DL grant in the PDCCH; or
determine that UL data transmitted by the terminal is not received on a PUSCH resource corresponding to a UL grant in the PDCCH.

In an implementation according to various embodiments of the present disclosure about the device for configuring a control channel, when transmitting the PDCCH to the terminal in the slot where the fallback PDCCH subsequent to the PDCCH is located, the first communication module 402 is specifically configured to: transmit the PDCCH to the terminal in a slot configured for the terminal where a first fallback PDCCH is located after determining that the terminal does not successfully receive the DCI in the PDCCH.

In another embodiment according to various embodiments of the present disclosure about the device for configuring a control channel, the first communication module 402 is further configured not to transmit the PDCCH to the terminal in a case that there is no data to be scheduled for the terminal subsequently; and/or not to transmit the PDCCH to the terminal in a case that there is no system information (SI) update indication or no paging to be transmitted to the terminal currently.

In an implementation according to various embodiments of the present disclosure about the device for configuring a control channel, when transmitting the DCI to the terminal via the PDCCH, the first communication module 402 is specifically configured to: execute an operation of transmitting the DCI to the terminal via the PDCCH in a case that there is no data to be scheduled for the terminal subsequently; or execute an operation of transmitting the DCI to the terminal via the PDCCH in a case that there is no SI update indication or no paging to be transmitted to the terminal currently.

In another embodiment according to various embodiments of the present disclosure about the device for configuring a control channel, the first communication module 402 is specifically configured to: transmit DCI to the terminal in a case that there is new data to be scheduled for the terminal; and/or transmit DCI to the terminal in a case that there is SI update indication or paging to be transmitted to the terminal.

Embodiments of the present disclosure further provide a network-side device, such as a base station, which includes the device for configuring a control channel according to any of the above embodiments of the present disclosure.

Figure 9:
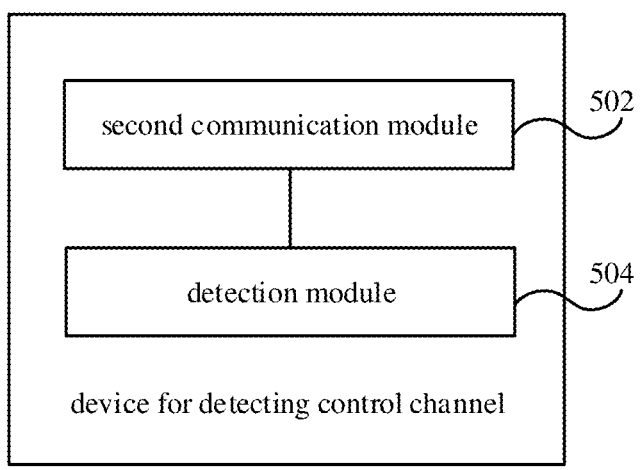
FIG. 9 is a schematic structural diagram of a device for detecting a control channel according to an embodiment in the embodiments of the present disclosure.

FIG. 9 is a schematic structural diagram of a device for detecting a control channel according to an embodiment in the embodiments of the present disclosure. The device for detecting a control channel according to the embodiment may be applied to a terminal, to implement various embodiments in the present disclosure about the foregoing method for detecting a control channel. As shown in FIG. 9, the device for detecting a control channel according to an embodiment includes:
a second communication module 502, configured to: in a case that DCI on a PDCCH is not successfully received, monitor the PDCCH in a slot or a time-frequency resource where a fallback PDCCH is located configured or reconfigured by a base station; and
a detection module 504, configured to instruct the second communication module 502 not to monitor the PDCCH in a slot indicated by the indication information, in a case that indication information for indicating not to monitor the PDCCH has been detected in the DCI carried by the PDCCH, where the indication information is used to indicate the slot where PDCCH is not monitored to be performed.

According to the above embodiments of the present disclosure, the device for detecting a control channel may monitor the PDCCH in the slot or the time-frequency resource in which the fallback PDCCH is located, which is configured by a base station, when it is detected that the DCI carried by the PDCCH includes indication information indicating not to monitor PDCCH, may not monitor the PDCCH in the slot indicated by the indication information, and when the DCI in the PDCCH is not successfully received, may monitor the PDCCH again in the slot or the time-frequency resource in which a subsequent fallback PDCCH is located. In the embodiments of the present disclosure, unnecessary blind detections of the terminal are reduced without affecting communication services, and the battery power of the terminal is saved, thereby reducing the power consumption of the terminal.

In addition, according to another embodiment in the embodiments of the present disclosure about the device for detecting a control channel, the second communication module 502 may be further configured to receive a slot set or the time-frequency resource where the fallback PDCCH is located, and the slot set or the time-frequency resource is configured by the base station.

In an implementation according to various embodiments of the present disclosure about the device for detecting a control channel, a slot set where the fallback PDCCH is located may include, for example, a periodicity of the fallback PDCCH and slots of the fallback PDCCH, and slots within each periodicity includes R subframes, R slots, R mini-slots, or R milliseconds, where R is an integer greater than 0.

In another embodiment of the present disclosure about the device for detecting a control channel, the second communication module 502 may be further configured to: configure or reconfigure indication information to indicate a time granularity of slots indicated by the indication information in accordance with RRC signaling or MAC CE transmitted by the base station, or in accordance with a protocol between the base station and the terminal. Accordingly, in an embodiment, when not monitoring PDCCH in the slot indicated by the indication information, the second communication module 502 is specifically configured to determine, according to the configured or reconfigured time granularity, the slot where PDCCH is not monitored to be performed indicated by the indication information, and configured not to monitor the PDCCH in the determined slot where PDCCH is not monitored to be performed.

In an implementation, the slots indicated by the indication information may be consecutive slots or non-consecutive slots, which, for example, may include but not limited to: N subframes, N slots. N mini-slots, N milliseconds, or an unknown slot after a slot in which the PDCCH is located, where N is an integer greater than 0. Each of the mini-slots may include M orthogonal frequency division multiplexing (OFDM) symbols, where M is an integer greater than 0 and less than 14, for example, M may be 2, 4, 7, or the like.

In another embodiment of the present disclosure about the device for detecting a control channel, in a case that the slot includes known slot resources, such as N subframes, N slots, N mini-slots, or N milliseconds after the slot in which the PDCCH is located, the second communication module 502 may be further configured to continue to monitor the PDCCH in a first slot in a PDCCH control resource set after the slot indicated by the indication information.

In another embodiment of the present disclosure about the device for detecting a control channel, when the slot indicated by the indication information is an unknown slot, in determining the slot where the PDCCH does not need to be monitored indicated by the indication information, the second communication module 502 is specifically configured to: determine preset slot resources starting from a slot of the PDCCH as time-frequency resources where the PDCCH does not need to be monitored. The preset slot resources may include consecutive or non-consecutive slots resources. The preset slot resources starting from the slot of the PDCCH include S subframes, S slots, S mini-slots, or S milliseconds. Each of the mini-slots includes Q OFDM symbols, S is an integer not less than 0, and Q is an integer greater than 0 and less than 14. Accordingly, in an embodiment, the second communication module 502 may be further configured to continue to monitor the PDCCH in a first slot in a PDCCH control resource set after the preset slot resources starting from the slot of the PDCCH.

In an implementation according to various embodiments of the present disclosure about the device for detecting a control channel, in a case that the second communication module 502 does not successfully receive the DCI in the PDCCH, when monitoring the PDCCH in a slot or a time-frequency resource where a fallback PDCCH is located configured by the base station, the second communication module 502 is specifically configured to: when a DL grant in the PDCCH is not successfully received, determine a slot where a first fallback PDCCH after a first duration is located as a slot for subsequent fallback PDCCH monitoring, and monitor the PDCCH in the slot where the first fallback PDCCH after the first duration is located. The first duration lasts from a time when the base station transmits the PDCCH to a time when the base station transmits the fallback PDCCH in a slot where a nearest fallback PDCCH is located, and within the first duration, the terminal feeds back an ACK/NACK signal and the base station fails to receive the ACK/NACK signal transmitted by the terminal.

In another implementation according to various embodiments of the present disclosure about the device for detecting a control channel, in a case that the second communication module 502 does not successfully receive the DCI in the PDCCH, when monitoring the PDCCH in a slot or a time-frequency resource where a fallback PDCCH is located configured by the base station, the second communication module 502 is specifically configured to: when a UL grant in the PDCCH is not successfully received, determine a slot where a first fallback PDCCH after a second duration is located as a slot for subsequent fallback PDCCH monitoring, and monitor the PDCCH in the slot where the first fallback PDCCH after the second duration is located. The second duration lasts from a time when the base station transmits the PDCCH to a time when the base station transmits the fallback PDCCH in a slot where a nearest fallback PDCCH is located, and within the second duration, UL data is transmitted on the PUSCH from the terminal to the base station, and is not received by the base station.

In another implementation according to various embodiments of the present disclosure about the device for detecting a control channel, wvhen monitoring the PDCCH in the slot resource where the fallback PDCCH is located configured by the base station, the second communication module 502 is specifically configured to: determine a slot where a first fallback PDCCH after the PDCCH is located as a slot for subsequent fallback PDCCH monitoring, and monitor the PDCCH in the slot where the first fallback PDCCH after the PDCCH is located.

In another embodiment of the present disclosure about the device for detecting a control channel, the second communication module 502 may be further configured to: in a case that the first fallback PDCCH is not successfully received, monitor the PDCCH in a slot where a fallback PDCCH immediately after the first fallback PDCCH is located.

Embodiments of the present disclosure further provide a terminal, which includes the device for detecting a control channel according to any of the above embodiments of the present disclosure.

In addition, embodiments of the present disclosure further provide a communication system, including: the network-side device according to any of the above embodiments of the present disclosure and the terminal according to any of the above embodiments of the present disclosure.

Figure 10:
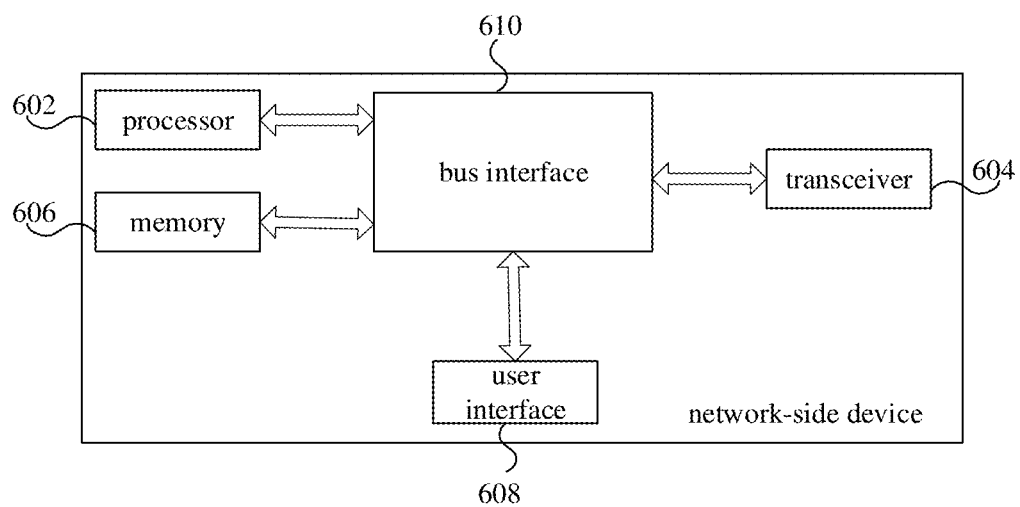
FIG. 10 is a block diagram of an exemplary network-side device according to an embodiment of the present disclosure.

Reference is made to FIG. 10, which is a structural diagram of a network-side device according to an embodiment of the present disclosure. The network-side device may be a device for communicating with a mobile device. The network-side device may be a base transceiver station (BTS) in global system of mobile communication (GSM) or code division multiple access (CDMA), a NodeB (NB) in wideband code division multiple access (WCDMA), an evolutional Node B (eNB or eNodeB) or access point in Long Term Evolution (LTE), a vehicle-mounted device, a wearable device, a network-side device in a future 5G network, or a network-side device in a future evolved Public Land Mobile Network (PLMN).

As shown in FIG. 10, the network-side device includes a processor 602, a transceiver 604, a memory 606, a user interface 608, and a bus interface 610. In FIG. 10, the bus architecture may include any number of interconnected buses and bridges, and specifically to link various circuits such as one or more of the processors 602 represented by the processor 602 and the memory 606 represented by the memory 606. The bus architecture can also connect various other circuits, such as peripherals, voltage regulators, and power management circuits, directly or indirectly, which are well known in the art and are therefore not further described herein. Bus interface 610 provides an interface. The transceiver 604 may include a plurality of elements, including a transmitter and a receiver, providing units for communicating with various other devices on a transmission medium. For different user equipment, the user interface 608 may also be an interface that can be externally connected to a required device. The connected devices include, but are not limited to, a keypad, a display, a speaker, a microphone, a joystick, and the like. The processor 602 is responsible for managing the bus architecture and common processing, and the memory 606 may store data used by the processor 602 in performing operations.

In embodiments of the present disclosure, the network-side device further includes a computer program that is stored in the memory 606 and executable on the processor 602. When the computer program is executed by the processor 602, steps in the foregoing method embodiments are implemented.

Figure 11:
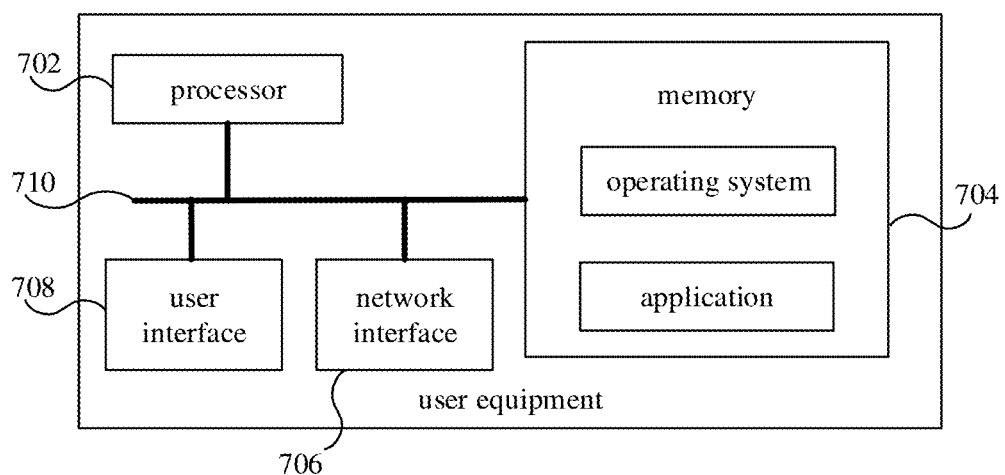
FIG. 11 is a block diagram of an exemplary user equipment according to an embodiment of the present disclosure.

Reference is made to FIG. 11, which is a structural diagram of another user equipment (which may also be referred to as a user terminal, a terminal device, or the like) according to an embodiment of the present disclosure. As shown in FIG. 11, the user equipment mainly includes at least one processor 702, a memory 704, at least one network interface 706, and a user interface 708. Components in the user equipment are coupled together by a bus system 710. Understandably, the bus system 710 is used to implement connection and communication among these components. In addition to the data bus, the bus system 710 includes a power bus, a control bus and a status signal bus. For clarity, various buses are all labeled as the bus system 710 in FIG. 11.

The user interface 708 may include a display, a keyboard, or a click device (e.g., a touchpad or a trackball), a touch panel or a touch screen, etc.

It is understood that the memory 704 provided by embodiments of the present disclosure may be a volatile memory 704 or a non-volatile memory 704, or may include both of the volatile memory 704 and non-volatile memory 704. The non-volatile memory 704 may be a read-only memory (ROM) 704, a programmable ROM (PROM) 704, an erasable PROM (EPROM) 704, an electrically EPROM (EEPROM) 704 or a flash memory 704. The volatile memory 704 may be a random access memory (RAM) 704, which is used as an external cache. By way of example and without any limitation, many forms of RAMs may be used, such as static RAM (SRAM) 704, dynamic RAM (DRAM) 704, synchronous DRAM (SDRAM) 704, double data rate SDRAM (DDRSDRAM) 704, enhanced SDRAM (ESDRAM) 704, Synchlink DRAM (SLDRAM) 704 and direct Rambus RAM (DRRAM) 704. The memory 704 in the systems and methods described herein is meant to include, without limitation, these and any other suitable types of memories 704.

In some implementations, the memory 704 stores the following elements: an executable module or a data structure, or a subset or extension set thereof, such as an operating system and an application.

The operating system includes various system programs, such as framework layer programs, core library layer programs and driver layer programs, to implement various fundamental services and process hardware-based tasks. The application includes various applications, such as media player and browser, to implement a variety of application services. The program implementing the methods according to the embodiments of the present disclosure may be included in the application.

In embodiments of the present disclosure, the user equipment may include: a computer program stored in the memory 704 and executable by the processor 702, specifically, a computer program in the application. The computer program is configured to be executed by the processor 702 to implement corresponding steps in the above method embodiments.

The methods disclosed in the foregoing embodiments of the present disclosure may be applied to the processor 702 or implemented by the processor 702. The processor 702 may be an integrated circuit with signal processing capability. During an implementation process, steps of the methods may be realized in form of hardware by integrated logical circuits in the processor 702, or in form of software by instructions. The processor 702 may be a general purpose processor 702, digital signal processor (DSP) 702, application specific integrated circuit (ASIC), field programmable gate array (FPGA) or other programmable logic device, discrete gate or transistor logic device, discrete hardware transistor logic device, discrete hardware component, that is capable of implementing or executing the various methods, steps and logic block diagrams disclosed in the embodiments of the present disclosure. The general purpose processor 702 may be a microprocessor 702, or any conventional processor 702, etc. The steps of the methods disclosed with reference to the embodiments of the present disclosure may be embodied in hardware in the form of a coding processor 702, or performed by the hardware in the coding processor 702 and the software modules in combination. The software modules may reside in well-established storage medium in the art, such as a RAM 704, flash memory, ROM 704, PROM 704 or EEPROM 704, register, etc. The storage medium resides in the memory 704. The processor 702 reads information from the memory 704 and performs the steps of the methods with its hardware.

In addition, embodiments of the present disclosure further provide a computer program including a computer-readable code. When the computer-readable code runs on a device, the processor 702 in the device executes instructions for implementing various steps in the method according to any of the above embodiments of the present disclosure.

In addition, embodiments of the present disclosure further provide a computer-readable storage medium, configured to store computer-readable instructions that, when executed, implement operations of various steps in the method according to any of the above embodiments of the present disclosure.

Embodiments in this specification are described in a progressive manner. Each embodiment focuses on the differences from other embodiments, and the same or similar parts of the embodiments may be referred to each other. For the system embodiments, since they basically correspond to the method embodiments, the description thereof is relatively simple. For related details, reference may be made to the description of the method embodiments.

Methods and devices of the present disclosure may be implemented in many ways. For example, the methods and devices disclosed herein may be implemented by software, hardware, firmware, or any combination of software, hardware, or firmware. The above order of the steps used in the methods described is only for illustration purposes, and steps of the methods disclosed herein are not limited to the order specifically described above unless otherwise specified. Furthermore, in some embodiments, the present disclosure may also be implemented as a program recorded in a recording medium that includes machine-readable instructions for implementing the methods according to the present disclosure. Thus, a recording medium that stores a program for executing the methods according to the present disclosure is also covered by the present disclosure.

In the embodiments of the present disclosure, a network-side device transmits downlink control information on a PDCCH according to indication information about a monitoring periodicity of the PDCCH, thereby avoiding power consumption caused by monitoring the PDCCH in each slot of a terminal, and reducing the PDCCH monitoring delay.

The network-side device may be a global system of mobile communication (GSM) or code division multiple access (CDMA) base transceiver station (BTS), or a wideband code division multiple access (WCDMA) NodeB (NB), or a LTE evolutional Node B (eNB or eNodeB), or a relay station or access point, or a future 5G network base station, etc., which is not limited herein.

It should be noted that, in the present disclosure, the terms "include", "have" or any other variants thereof are meant to cover non-exclusive inclusion, so that a process, method, item or apparatus including a series of elements is not limited to those elements, and optionally includes other elements that are not specifically listed or that are inherent in the process, method, item or apparatus. With no other limitations, an element restricted by the phrase "include a . . . " does not exclude the existence of other identical elements in the process, method, item or apparatus including the element.

Through the descriptions of the above embodiments, those skilled in the art can clearly understand that the methods in the above embodiments can be implemented by means of software plus a necessary universal hardware platform, and also may be implemented by hardware, but in many cases the former is preferred. Based on this understanding, the technical solution of the present disclosure that is essentially or contributes to the conventional technologies can be embodied in the form of a software product that is stored in a storage medium (such as a ROM/RAM, a magnetic disk, or an optical disc), which includes several instructions for enabling a terminal (which may be a mobile phone, a computer, a server, an air conditioner, or a network device) to execute the method described in the embodiments of the present disclosure.

The description of the present disclosure is given for the sake of example and explanation, which is not exhaustive, and the present disclosure is not limited to the disclosed forms. Many modifications and changes may be apparent to those of ordinary skill in the art. The embodiments are selected and described so as to better illustrate principles and practical applications of the present disclosure, and to enable those of ordinary skill in the art to understand the present disclosure to design various embodiments with various modifications and applicable to specific applications.

What is claimed is:

1. A method for configuring a control channel, applied to a network-side device, comprising:
    transmitting, to a terminal, downlink control information (DCI) in a first physical downlink control channel (PDCCH), wherein the DCI comprises indication information for indicating a slot in which a second PDCCH does not need to be monitored subsequently; and
    transmitting, to the terminal, the first PDCCH in a slot or a time-frequency resource where a fallback PDCCH subsequent to the first PDCCH is located, when determining that the terminal does not successfully receive the DCI in the first PDCCH,
    wherein the method further comprises: configuring a slot set or the time-frequency resource where the fallback PDCCH is located by a DCI, or a radio resource control (RRC) signaling, or a media access control control element (MAC CE.

2. The method according to claim 1, wherein the configuring the slot set where the fallback PDCCH is located for the terminal comprises:
    configuring, for the terminal, a periodicity of the fallback PDCCH and slots of the allback PDCCH, wherein each periodicity comprises R subframes, R slots, R mini-slots, or R milliseconds, R being an integer greater than 0.

3. The method according to claim 1, wherein the slots indicated by the indication information comprises consecutive slots or non-consecutive slots; and
    the slots indicated by the indication information comprises N subframes, N slots, N mini-slots, N milliseconds, or unknown slots after a slot where the first PDCCH is located, and each of the mini-slots comprises M orthogonal frequency division multiplexing (OFDM) symbols, wherein N is an integer greater than 0, and M is an integer greater than 0 and less than 14.

4. The method according to claim 1, further comprising:
    configuring or reconfiguring, for the terminal, a time granularity of slots indicated by the indication information, by the RRC signaling or the MAC CE; or
    configuring or reconfiguring a time granularity of slots indicated by the indication information, in accordance with a protocol between the network-side device and the terminal.

5. The method according to claim 1, wherein the determining that the terminal does not successfully receive the DCI in the first PDCCH comprises:
    determining that an acknowledgement or negative acknowledgement (ACK/NACK) signal transmitted by the terminal is not received on an ACK/NACK resource corresponding to a downlink (DL) grant in the first PDCCH; or
    determining that uplink (UL) data transmitted by the terminal is not received on a physical uplink shared channel (PUSCH) resource corresponding to a UL grant in the first PDCCH.

6. The method according to claim 1, wherein the transmitting the first PDCCH to the terminal in the slot where the fallback PDCCH subsequent to the first PDCCH is located comprises:
    transmitting, to the terminal, the first PDCCH in the a first slot where a fallback PDCCH subsequent to the first PDCCH is located.

7. The method according to claim 1, further comprising:
    in a case that there is no data to be scheduled for the terminal subsequently, not transmitting the second PDCCH to the terminal; and/or
    in a case that there is no system information (SI) update indication or no paging to be transmitted to the terminal currently, not transmitting the second PDCCH to the terminal.

8. The method according to claim 7, further comprising:
    in a case that there is new data to be scheduled for the terminal, transmitting DCI to the terminal; and/or
    in a case that there is an SI update indication or paging to be transmitted to the terminal, transmitting DCI to the terminal.

9. A method for detecting a control channel, applied to a terminal, comprising:
    in a case that indication information for indicating a slot in which a second physical downlink control channel (PDCCH) does not need to be monitored subsequently has been detected in downlink control information (DCI) carried by a PDCCH, not monitoring the second PDCCH in the slot indicated by the indication information; and
    in a case that the DCI in the first PDCCH is not successfully received, monitoring the first PDCCH in a slot or a time-frequency resource where a fallback PDCCH is located, wherein the slot or the time-frequency resource is configured by a network-side device,
    wherein the method further comprises: receiving a slot set or the time-frequency resource where the fallback PDCCH is located, wherein the slot set or the time-frequency resource is configured by the network-side device.

10. The method according to claim 9, wherein the slot set where the fallback PDCCH is located comprises: a periodicity of the fallback PDCCH and slots of the fallback PDCCH, and each periodicity comprises R subframes, R slots, R mini-slots, or R milliseconds, R being an integer greater than 0.

11. The method according to claim 9, further comprising:
configuring or reconfiguring, in accordance with the RRC signaling or the MAC CE transmitted by the network-side device, a time granularity of the slot indicated by the indication information; or
configuring or reconfiguring, in accordance with a protocol between the network-side device and a terminal a time granularity of the slot indicated by the indication information,
wherein the not monitoring the second PDCCH in the slot indicated by the indication information comprises:
determining, according to the configured or reconfigured time granularity, the slot where the second PDCCH is not monitored indicated by the indication information; and
not monitoring the second PDCCH in the determined slot where the second PDCCH is not monitored.

12. The method according to claim 11, wherein the slot indicated by the indication information comprises consecutive slots or non-consecutive slots;
the slot indicated by the indication information comprises N subframes, N slots, N mini-slots, N milliseconds, or unknown slots after a slot where the first PDCCH is located, and each of the mini-slots comprises M orthogonal frequency division multiplexing (OFDM) symbols, wherein N is an integer greater than 0, and M is an integer greater than 0 and less than 14; and
the method further comprises: continuing to monitor the second PDCCH in a first slot in a control resource set of the first PDCCH after the slot indicated by the indication information.

13. The method according to claim 11, wherein the slot indicated by the indication information comprises an unknown slot;
the determining the slot where PDCCH is not monitored indicated by the indication information comprises: determining preset slot resources starting from a slot of the PDCCH as time-frequency resources where PDCCH is not monitored, wherein the preset slot resources comprise consecutive or non-consecutive slots resources, the preset slot resources starting from the slot of the PDCCH comprise: S subframes, S slots, S mini-slots, or S milliseconds, and each of the mini-slots comprises Q OFDM symbols, wherein S is an integer not less than 0, and Q is an integer greater than 0 and less than 14; and
the method further comprises: continuing to monitor the PDCCH in a first slot in a control resource set of the PDCCH after the preset slot resources starting from the slot of the PDCCH.

14. The method according to claim 9, wherein in a case that the DCI in the first PDCCH is not successfully received, monitoring the first PDCCH in the slot or the time-frequency resource where the fallback PDCCH is located, wherein the slot or the time-frequency resource is configured by the network-side device comprises:
when a downlink (DL) grant in the first PDCCH is not successfully received, determining the first slot where a fallback PDCCH after a first duration is located as a slot for subsequent fallback PDCCH monitoring, and monitoring the first PDCCH in the first slot where the fallback PDCCH after the first duration is located, wherein the first duration lasts from a time when the network-side device transmits the first PDCCH to a time when the network-side device transmits the fallback PDCCH in a slot where a nearest fallback PDCCH is located, and within the first duration, the terminal feeds back an ACK/NACK signal and the network-side device fails to receive the ACK/NACK signal transmitted by the terminal; or
wherein in a case that the DCI in the first PDCCH is not successfully received, monitoring the first PDCCH in the slot or the time-frequency resource where the fallback PDCCH is located, wherein the slot or the time-frequency resource is configured by the network-side device comprises:
when an uplink (UL) grant in the first PDCCH is not successfully received, determining the first slot where a fallback PDCCH after a second duration is located as a slot for subsequent fallback PDCCH monitoring, and monitoring the first PDCCH in the first slot where the fallback PDCCH after the second duration is located, wherein the second duration lasts from a time When the network-side device transmits the first PDCCH to a time when the network-side device transmits the fallback PDCCH in a slot where a nearest fallback PDCCH is located, and within the second duration, the terminal transmits UL data on a PUSCH to the network-side device, and the network-side device fails to receive the UL data transmitted on the PUSCH.

15. The method according to claim 9, wherein the monitoring the first PDCCH in a slot resource where the fallback PDCCH is located, wherein the slot or the time-frequency resource is configured by the network-side device comprises:
determining a slot where a first fallback PDCCH after the first PDCCH is located as a slot for subsequent fallback PDCCH monitoring, and monitoring the first PDCCH in the slot where the first thilback PDCCH after the first PDCCH is located; and/or
wherein the method further comprises:
monitoring the first PDCCH in a slot where a fallback PDCCH immediately after the first fallback PDCCH is located, in a case that the first fallback PDCCH is not successfully received.

16. A network-side device, comprising a processor, a memory, and a program stored in the memory and executable on the processor, wherein the processor is configured to execute the program to implement operations of steps in the method according to claim 1.

17. A terminal, comprising a processor, a memory, and a program stored in the memory and executable on the processor, wherein the processor is configured to execute the program to implement following operations:
in a case that indication information for indicating a slot in which a second physical downlink control channel (PDCCH) does not need to be monitored subsequently has been detected in downlink control information (DCI) carried by a first the PDCCH, not monitoring the second PDCCH in the slot indicated by the indication information; and
in a case that the DCI in the first PDCCH is not successfully received, monitoring the first PDCCH in a slot or a time-frequency resource where a fallback PDCCH is located, wherein the slot or the time-frequency resource is configured by a network-side device,
wherein the processor is further configured to: receive a slot set or the time-frequency resource where the fallback PDCCH is located, wherein the slot set or the time-frequency resource is configured by the network-side device.

18. The terminal according to claim 17, wherein the processor is configured to:
when a downlink (DL) grant in the first PDCCH is not successfully received, determine the first slot where a fallback PDCCH after a first duration is located as a slot for subsequent fallback PDCCH monitoring, and monitor the first PDCCH in the first slot where the fallback PDCCH after the first duration is located, wherein the first duration lasts from a time when the network-side device transmits the first PDCCH to a time when the network-side device transmits the fallback PDCCH in a slot where a nearest fallback PDCCH is located, and within the first duration, the terminal feeds back an ACK/NACK signal and the network-side device fails to receive the ACK/NACK signal transmitted by the terminal; or
when an uplink (UL) grant in the first PDCCH is not successfully received, determine the first slot where a fallback PDCCH after a second duration is located as a slot for subsequent fallback PDCCH monitoring, and monitor the first PDCCH in the first slot where the fallback PDCCH after the second duration is located, wherein the second duration lasts from a time when the network-side device transmits the first PDCCH to a time when the network-side device transmits the fallback PDCCH in a slot where a nearest fallback PDCCH is located, and within the second duration, the terminal transmits UL data on a PUSCH to the network-side device, and the network-side device fails to receive the UL data transmitted on the PUSCH.

19. The terminal according to claim 17, wherein the slot set where the fallback PDCCH is located comprises: a periodicity of the fallback PDCCH and slots of the fallback PDCCH, and each periodicity comprises R subframes, R slots, R mini-slots, or R milliseconds, R being an integer greater than 0.

20. The terminal according to claim 17, wherein the processor is further configured to:
configure or reconfigure, in accordance with the RRC signaling or the MAC CE transmitted by the network-side device, a time granularity of the slot indicated by the indication information; or
configure or reconfigure, in accordance with a protocol between the network-side device and a terminal a time granularity of the slot indicated by the indication information,
wherein when monitoring the second PDCCH in the slot indicated by the indication information, the processor is specifically configured to:
determine, according to the configured or reconfigured time granularity, the slot where the second PDCCH is not monitored indicated by the indication information; and
not monitor the second PDCCH in the determined slot where the second PDCCH is not monitored.

* * * * *